(12) United States Patent
Bhatia et al.

(10) Patent No.: US 8,875,154 B2
(45) Date of Patent: Oct. 28, 2014

(54) INTERFACE SPECIFIC AND PARALLEL IPMI MESSAGE HANDLING AT BASEBOARD MANAGEMENT CONTROLLER

(71) Applicant: American Megatrends, Inc., Norcross, GA (US)

(72) Inventors: Anurag Bhatia, Lilburn, GA (US); Winston Thangapandian, Duluth, GA (US)

(73) Assignee: American Megatrends, Inc., Norcross, GA (US)

( * ) Notice: Subject to any disclaimer, the term of this patent is extended or adjusted under 35 U.S.C. 154(b) by 77 days.

(21) Appl. No.: 13/749,953

(22) Filed: Jan. 25, 2013

(65) Prior Publication Data

US 2014/0215489 A1  Jul. 31, 2014

(51) Int. Cl.
*G06F 9/54* (2006.01)

(52) U.S. Cl.
CPC ..................... *G06F 9/546* (2013.01)
USPC .......................... 719/313; 709/223

(58) Field of Classification Search
CPC ........................................................ G06F 9/546
See application file for complete search history.

(56) References Cited

U.S. PATENT DOCUMENTS

2005/0267956 A1 * 12/2005 Huang .......................... 709/223
2006/0184536 A1 *  8/2006 Jreij et al. ....................... 707/10

* cited by examiner

*Primary Examiner* — H S Sough
*Assistant Examiner* — Syed Roni
(74) *Attorney, Agent, or Firm* — Morris Manning & Martin, LLP; Tim Tingkang Xia, Esq.

(57) ABSTRACT

Certain aspects of the present disclosure are directed to a baseboard management controller (BMC). The BMC includes a processor and a memory storing firmware. The firmware, when executed by the processor, is configured to include a plurality of communication interfaces and a plurality of message handlers. The plurality of message handlers each are configured to process an IPMI request message that is received from, and that is to be associated with, a respective different communication interface of the plurality of communication interfaces; to perform a management function to a host computer of the BMC in accordance with the processed IPMI request message; and to be on a respective different thread.

19 Claims, 2 Drawing Sheets

INTERFACE SPECIFIC AND PARALLEL IPMI MESSAGE HANDLING AT BASEBOARD MANAGEMENT CONTROLLER

FIELD

The present disclosure generally relates to baseboard management controllers, and more particularly to interface specific and parallel Intelligent Platform Management Interface (IPMI) message handling at baseboard management controllers.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Generally, the term "computer system" refers to either a stand-alone system or a plurality of interconnected systems, such as, for instance, a client-server network. Regardless of the implementation, the various components making up a computer system typically operate within a range of parameters defined by performance protocols or standards. For instance, the temperature within a computer chassis is often monitored in order to detect periods in time when the system may rise above a certain predetermined temperature reading. Other forms of information that may be monitored within a computer system include, without limitation, voltages associated with semiconductor components located on the baseboard of the system, velocity (e.g., rpm) of cooling fans located on the baseboard or within the system chassis, and the velocity of spindle motors within hard disk drives or optical drives.

Various types of sensors are being used to detect operating and performance-related parameters associated with a computer system and its constituent components. Referring to the examples provided above, these sensors include thermostats, voltage meters and tachometers. A computer system typically employs one or more management modules to assist in the collection and analysis of information sensed by the various sensors measuring operating and performance-related parameters within the system. These management modules may be either software or hardware components, but typically encompass both hardware and software components. One such management module is referred to as a "Baseboard Management Controller" (BMC). The BMC is a microcontroller of a computer system and having a specified number of contact pins through which information sensed by various sensors is received for analysis by the BMC. In order to perform this analysis, the BMC is programmed with firmware for implementing procedures relating to system monitoring and recovery. With this firmware, the BMC is programmed to monitor various operating and performance-related parameters sensed within a computer system and to analyze this information to determine whether any of the sensed parameters are currently outside of an expected or recommended operating range, the occurrence of which is commonly referred to as an "event."

Conventionally, a BMC utilizes a common/central message handling entity that receives IPMI messages from all communication interfaces and handles them in the sequence received. Therefore, unaddressed needs exist in the art to address the deficiencies and inadequacies.

SUMMARY

Certain aspects of the present disclosure are directed to a baseboard management controller (BMC). The BMC includes a processor and a memory storing firmware. The firmware, when executed by the processor, is configured to include a plurality of communication interfaces and a plurality of message handlers. The plurality of message handlers each are configured to process an IPMI request message that is received from, and that is to be associated with, a respective different communication interface of the plurality of communication interfaces; to perform a management function to a host computer of the BMC in accordance with the processed IPMI request message; and to be on a respective different thread.

In certain embodiments, the firmware is configured to include: a plurality of message handler queues each configured to temporarily store the IPMI request message received from, and to be associated with, a respective different communication interface of the plurality of communication interfaces; and to run on the same thread as the thread of the message handler that is associated with the respective different communication interface. The associated message handler retrieves the IPMI request message from the each message handler queue and processes the retrieved IPMI request message. In certain embodiments, the plurality of communication interfaces include at least one of a network interface, a Keyboard Controller Style (KCS) interface, an Intelligent Platform Management Bus (IPMB) interface, a Universal Serial Bus (USB) interface, a serial interface, a User Data Services (UDS) interface, a block transfer interface, and a system management bus interface.

In certain embodiments, the firmware is configured to include: a plurality of task modules each configured to be in communication and associated with a respective different communication interface of the plurality of communication interfaces. The plurality of task modules each are configured to receive data from the respective different communication interface. The plurality of task modules each are configured to construct an IPMI request message based on the received data. The plurality of task modules each are configured to post the constructed IPMI request message to the message handler queue associated with the respective different communication interface. The plurality of task modules each are configured to run on a respective thread different from each other and from the threads on which the message handlers run.

In certain embodiments, each of the plurality of message handlers is configured to construct an IPMI response message, responding to the IPMI request message that is to be sent to the communication interface associated with the each message handler. In certain embodiments, each of the plurality of message handlers is configured to post the constructed IPMI response message to the task module associated with the communication interface that is associated with the each message handler. In certain embodiments, the plurality of task modules each are configured to determine whether the constructed IPMI request message is an IPMI bridged message.

In certain embodiments, each of the message handlers is configured to utilize a mutual exclusion mechanism to access at least one data collection that is accessible by each of the message handlers. In certain embodiments, the at least one data collection includes at least one of a Sensor Data Record (SDR), a System Event Log (SEL), Field Replaceable Unit (FRU) data, and chassis information data.

Certain aspects of the present disclosure are directed to a method for processing IPMI messages on a BMC. The BMC includes a processor and a memory storing firmware. The firmware includes first and second communication interfaces and first and second message handlers. The method includes processing, at the first and second message handlers, IPMI request messages that are received from the first and second communication interfaces, respectively; performing a management function to a host computer of the BMC in accordance with each of the processed IPMI request; and executing the first and second message handlers on first and second threads, respectively.

Certain aspects of the present disclosure are directed to a non-transitory computer storage medium having computer-executable instructions stored thereon. The instructions are executed by a processor of a BMC. The BMC includes a memory storing firmware. The firmware includes first and second communication interfaces and first and second message handlers. The instructions cause the processor to process, at the first and second message handlers, IPMI request messages that are received from the first and second communication interfaces, respectively; to perform a management function to a host computer of the BMC in accordance with each of the processed IPMI request; and to execute the first and second message handlers on first and second threads, respectively.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
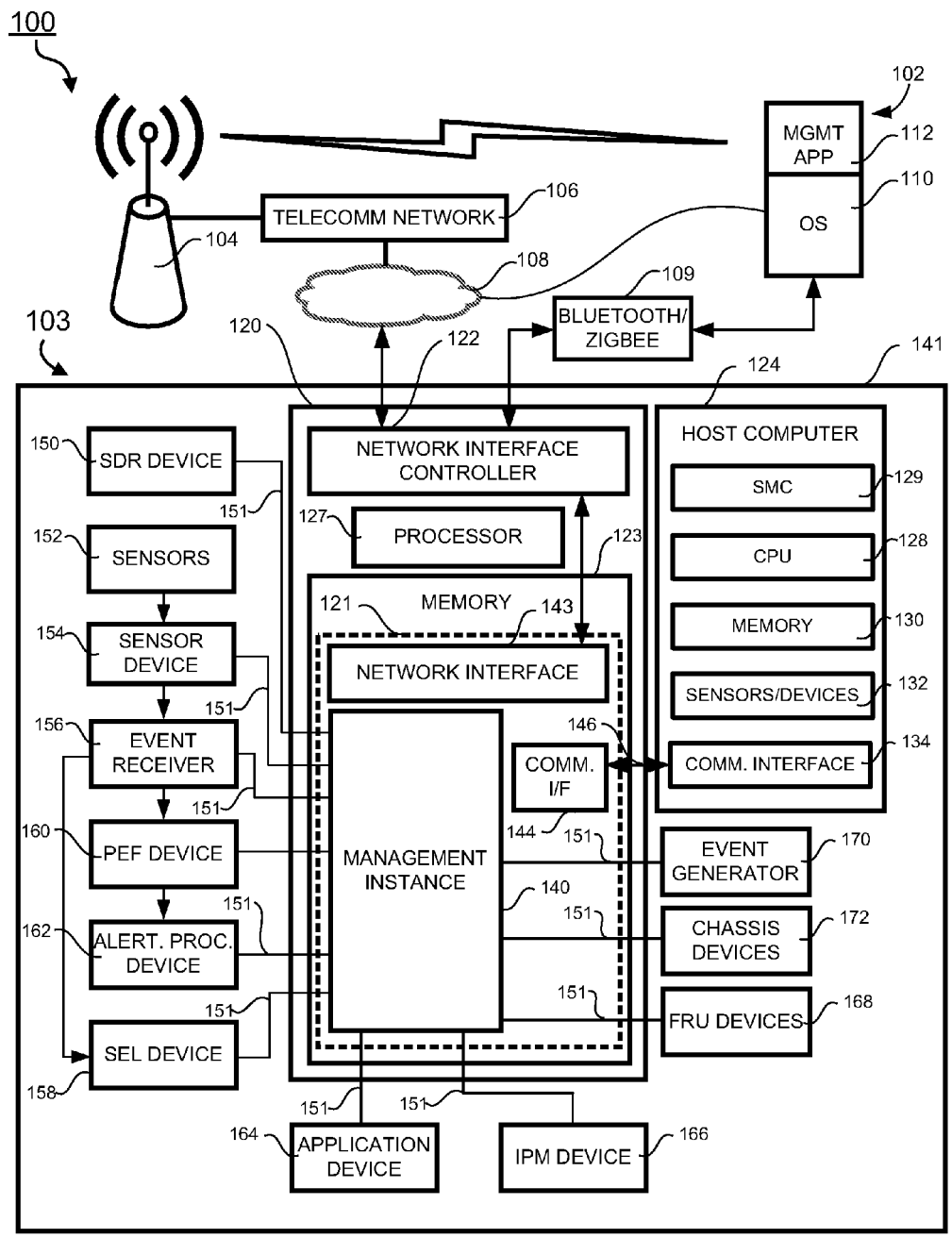
FIG. 1 is a conceptual illustration of a computer management system in accordance with certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate; meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Referring to FIG. 1, a conceptual illustration of a networked management computer system 100 is shown according to one embodiment of the present disclosure. The networked management computer system 100 includes, a remote device 102, a managed computer system 103 including a management device 120, and managed host computer 124. In certain embodiments, the management device 120 can be a Baseboard Management Controller (BMC), and the host computer can be computer boards or blade servers plugged onto a back plane in a chassis 141. The management device 120 communicatively connected to the managed host computer 124. The management device 120 may be a general purpose computer system. It should be appreciated that the management device 120 may alternatively be a "special purpose" computer system or a system that incorporates more than one interconnected system, such as a client-server network. Indeed, the management device 120 of FIG. 1 only represents an exemplary embodiment of the present disclosure, and therefore, should not be considered to limit the disclosure in any manner. A BMC will now be used in the description as an example of the management device 120. One skilled in the art would appreciate that other similar devices can be used in place of the BMC 120. The BMC 120 includes a processor 127, firmware 121 stored in a memory 123, and a network interface controller 122.

Intelligent Platform Management Interface ("IPMI") is an industry standard for system monitoring and event recovery. The IPMI specification provides a common message-based interface for accessing all of the manageable features in a compatible computer. IPMI includes a rich set of predefined commands for reading temperature, voltage, fan speed, chassis intrusion, and other parameters. System event logs, hardware watchdogs, and power control can also be accessed through IPMI. In this manner, IPMI defines protocols for accessing the various parameters collected by a BMC 120 through an operating system or through an external connection, such as through a network or serial connection. Additional details regarding IPMI can be found in the IPMI Specification (Version 2.0), which is publicly available from INTEL CORPORATION, and which is incorporated herein by reference.

IPMI uses message-based interfaces for the different interfaces to the platform management subsystem such as IPMB, serial/modem, LAN, ICMB, PCI Management Bus, and the system software-side "System Interface" to the BMC 120.

All IPMI messages share the same fields in the message 'payload'-regardless of the interface (transport) that they are transferred over. The same core of IPMI messages is available over every IPMI-specified interface, they are just 'wrapped' differently according to the needs of the particular transport. This enables a piece of management software that works on one interface to be converted to use a different interface mainly by changing the underlying 'driver' for the particular transport.

IPMI messaging uses a request/response protocol. IPMI request messages are commonly referred to as commands. The use of a request/response protocol facilitates the transfer of IPMI messages over different transports. It also facilitates multi-master operation on busses like the IPMB and ICMB, allowing messages to be interleaved and multiple management controllers to directly intercommunicate on the bus.

IPMI commands are grouped into functional command sets, using a field called the Network Function Code. There are command sets for sensor and event related commands, chassis commands, etc. This functional grouping makes it easier to organize and manage the assignment and allocation of command values.

All IPMI request messages have Network Function, command, and optional data fields. All IPMI response messages carry Network Function, command, optional data, and a completion code field. As inferred earlier, the difference between the different interfaces has to do with the framing and protocols used to transfer this payload. For example, the IPMB protocol adds fields for $I^2C$ and controller addressing, and data integrity checking and handling, whereas the LAN interface adds formatting for sending IPMI messages as LAN packets.

In one embodiment, the remote device 102 includes a management application 112 running on an operating system 110. In certain embodiments, the remote device 102 is in communication with a wireless base station 104, which is connected with a telecommunication network 106. The telecommunication network 106, through another computer network 108 such as LAN/WAN/Internet/WI-FI, is in communication with the managed computer system 103. In certain embodiments, the remote device 102 is directly connected with the computer network 108. In certain embodiments, the remote device 102 is connected with the managed computer system 103 through Bluetooth or Zigbee. Thus, the management application 112 on the remote device 102 can construct an IPMI or BMC message and send the message to the managed computer system 103 through the telecommunication network 106 and the computer network 108 in order to perform a management action or operation on the managed computer system 103. The IPMI message may include, among other things: (1) the source IP/MAC address, (2) a session ID, (3) a sequence number, (4) a Responder's Address, (5) the Responder's Logic Unit Number (LUN), (6) a Requester's Address, (7) the Requester's LUN, (8) command CMD, and (9) a message Channel number. In certain embodiments, the IPMI message may also include encapsulated data for IPMB request. The encapsulated data for IPMB request may include: (1) the Responder's Address, (2) the Responder's LUN, (3) the Requester's Address, (4) the Requester's LUN, (5) the command CMD, e.g., Get Sensor Reading, and (6) the sensor number.

The management device 120 includes a network interface controller 122 that is in communication with the computer network 108. The management device 120 also includes a processor 127 and a memory 123 having firmware 121 stored on it. When the firmware 121 is executed by the processor 127, the firmware 121 can initiate a management instance 140, such as an IPMI software stack or BMC software stack that performs management functions of the computer system 103. The firmware includes a network interface 143, through which the management instance can be in communication with the network interface controller 122. The firmware 121 includes one or more communication interfaces 144 that can be utilized by the management instance 140 to send IPMI or BMC messages to, and receive IPMI or BMC messages from, the managed host computer through different communication channels. The communication interface 144 can include any system interface defined by the IPMI, i.e., keyboard controller style ("KCS") interface, a system management interface chip ("SMIC") interface, a block transfer ("BT") interface, and SMBus System Interface (SSIF). The communication interface 144 can also include a USB interface, a network interface, such as an IPMI LAN interface, and a serial/modem interface.

In certain embodiments, the host computer 124 has a CPU 128, a memory 130, sensors/devices 132, and a satellite management controller (SMC) 129. The managed host computer 124 also has one or more communication interface 134 that corresponds to the communication interfaces 144 of the BMC 120. A corresponding communication channel 146 is established between the corresponding communication interfaces 144 of the BMC 120 and the communication interface 134 of the managed host computer 124. Therefore, the BMC 120 and the managed host computer 124 can communicate with each other through the communication channel 146. For example, both the BMC 120 and the managed host computer 124 each can have a system management bus interface 144 and 134 and communicate with each other through a system management bus 146 connecting the system management bus interfaces 144 and 134.

In general, the management instance 140 monitors operation, performance, and health-related aspects associated with the managed host computer 124, such as the temperature of one or more components of the managed host computer 124, speed of rotational components (e.g., spindle motor, CPU Fan, etc.) within the system, the voltage across or applied to one or more components within the managed host computer 124, and the available or used capacity of memory devices within the managed host computer 124. The management instance 140 is communicatively connected to the one or more management devices such as IPM Device 166, Sensor Device 154, SDR Repository Device 150, SEL Device 158, FRU Inventory Device 168, Event Receiver Device 156, Event Generator Device 170, Application Device 164, PEF Device 160, Alert Processing Device 162, and Chassis Device 172. Each of the above devices can be either a logical device or a physical device, and can communicate with the management instance 140 through an established communication channel 151 such as a system management bus. In one embodiment, these components include sensor devices 132 for measuring various operating and performance-related parameters within the managed host computer 124. A sensor 152 and the sensor devices 154 may be either hardware or software based components configured or programmed to measure or detect one or more of the various operating and performance-related parameters. The management instance 140 may receive this information sensed by the sensors 152, 154 via a communication bus for analysis, and more particularly, for determination as to whether an "event" is occurring within the managed computer system 103. For example, like many electrical components, the CPU 128 dissipates heat while operating. As such, a CPU fan (not shown in FIG. 1) can be used to cool off the CPU 128 after the CPU 128 reaches a prescribed temperature. Such a determination, i.e., whether the CPU 128 exceeds a prescribed temperature, can be made by the management instance 140.

In certain embodiments, the management instance 140 and the managed host computer 124 each can have an IPMB interface 134, 144 connected to an IPMB bus 146 and communicate with each other through the IPMB bus 146. The managed host computer 124 may have one or more managed devices 132. The management instance 140 can communicate with the managed devices 132 through the IPMB bus 146. Further, a managed host computer 124 may also have a satellite management controller 129. The management instance 140 can communicate with the satellite management controller 129 through the IPMB bus.

In general, the BMC 120 is a microcontroller that monitors operation of the management computer system 103. In a more specific embodiment, the BMC 120 monitors health-related aspects associated with the management computer system 103, such as, but not limited to, the temperature of one or more components of the management computer system 103, speed of rotational components (e.g., spindle motor, CPU Fan, etc.) within the system, the voltage across or applied to one or more components within the system 100, and the available or used capacity of memory devices within the system 100. To accomplish these monitoring functions, the BMC 120 is communicatively connected to one or more components by way of a communication interface such as the management bus. In an embodiment, these components include sensor devices for measuring various operating and performance-related parameters within the management computer system 103. The sensor devices may be either hardware or software based components configured or programmed to measure or detect one or more of the various operating and performance-related parameters.

Figure 2:
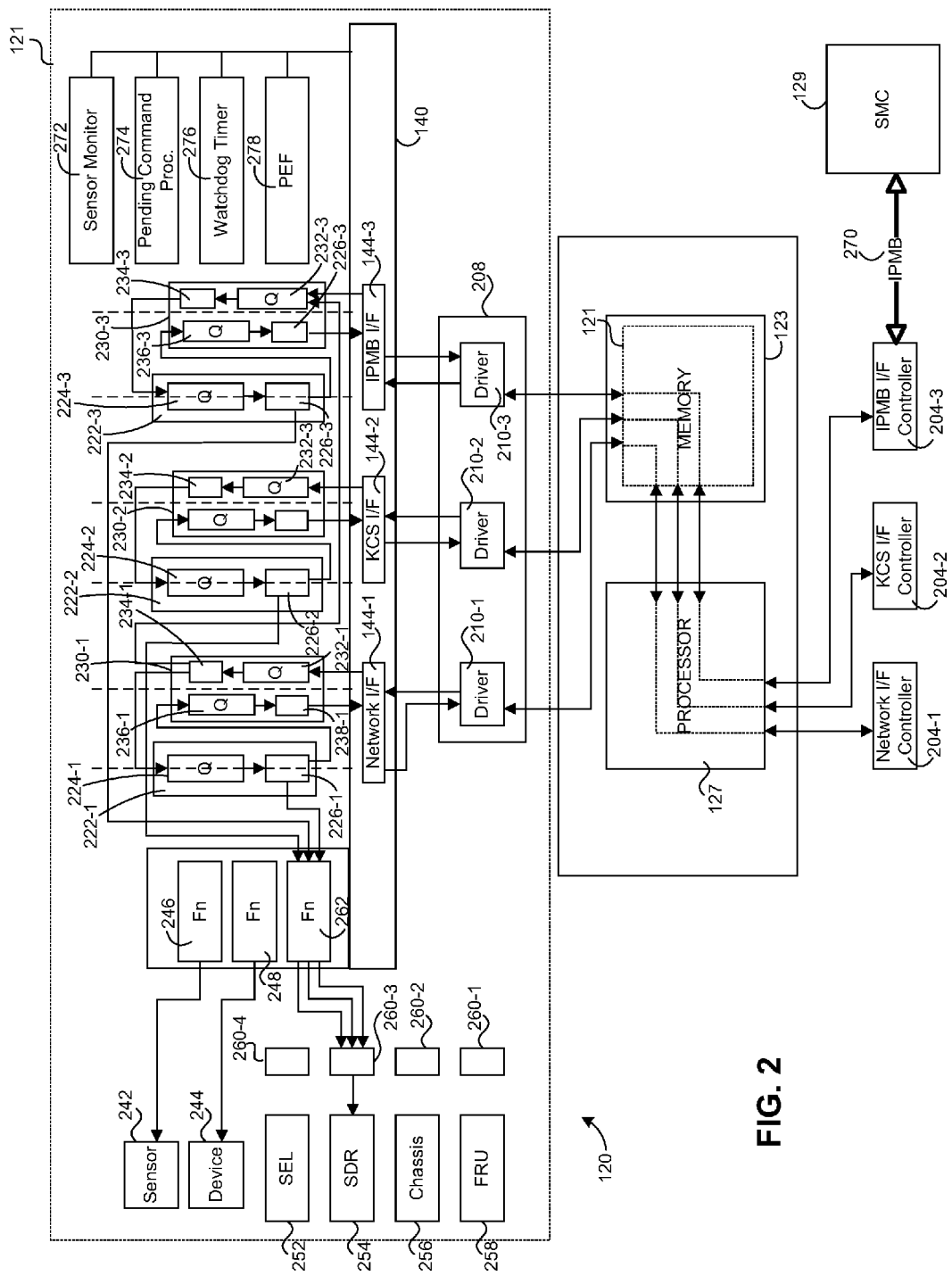
FIG. 2 illustrates an architecture of a BMC in accordance with certain embodiments of the present disclosure.

FIG. 2 illustrates an architecture of a BMC 120 in accordance with certain embodiments of the present disclosure. The BMC 120 includes, among other things, a processor 127, a memory 123, and one or more communication interface controllers 204. Each of the communication interface controllers 204 can be any type of communication interface controller that can be utilized by the BMC 120, such as a network interface controller 204-1, a KCS interface controller 204-2, an IPMB interface controller 204-3, a USB interface controller, a serial interface controller, a UDS interface controller, a block transfer interface controller, a system management bus interface controller. The specific example shown in FIG. 2 includes a network interface controller 204-1, a KCS interface controller 204-2, and an IPMB interface controller 204-3.

The memory 123 loads firmware 121 to be executed by the processor. In certain embodiments, the firmware 121 includes a kernel 208 having one or more interface drivers 210 that corresponds to the one or more interface controllers 204 of the BMC 120. In the example shown in FIG. 2, the firmware 121 includes a network interface driver 210-1, a KCS interface driver 210-2, and an IPMB interface driver 210-3.

Further, the kernel 208 initiates a management instance 140 in a process. The management instance 140 initiates a communication interface 144 for each of the communication interface controllers 204. The communication interfaces 144 allows the management instance 140 to communicate with the communication interface drivers 210 in the kernel 208. Accordingly, the management instance 140 can send and receive data from the communication interface controllers 204. In the example shown in FIG. 2, the management instance 140 initiates a network interface 144-1, a KCS interface 144-2, and an IPMB interface 144-3. Each communication interface 144 can, through the corresponding communication interface driver 210, receive data sent by a corresponding communication interface controller 204 and send data to that communication interface controller 204. For example, the network interface 144-1 can receive IP packets encapsulating IPMI messages sent from the network interface controller 204-1 through the network interface driver 210-1.

The management instance 140, based on information provided by the kernel 208 or information stored in a configuration file, initiates a message processing module 222 for each type of the communication interface controllers 204 in a separate thread, thus implementing parallel processing of communication interface specific IPMI messages. That message processing module 222 is associated with the each communication interface 144 and the thread running that message processing module 222. In the example shown in FIG. 2, the firmware 121 initiates a first thread having a network message processing module 222-1, a second thread having a KCS network message processing module 222-2, and a third thread having an IPMB message processing module 222-3. Each message processing module 222 utilizes a corresponding network interface 144 to communicate with a corresponding interface driver 210. For example, the network message processing module 222-1 uses the network interface 144-1 that is in communication with the network interface driver 210-1; the KCS message processing module 222-2 uses the KCS interface 144-2 that is in communication with the KCS interface driver 210-2; the IPMB message processing module 222-3 uses the IPMB interface 144-3 that is in communication with the IPMB interface driver 210-3. In other words, each type of messages is handled separately by a message processing module 222 on a different thread.

Each of the message processing module 222 includes a message handler queue 224 for temporarily storing the messages received from the communication interface 144, and a message handler 226 that retrieves a message from the message queue 224 and processes the message. The message handler 226, in accordance with the command included in the message, can invoke one or more management functions of the BMC 120.

Further, for each communication interface 144 the management instance 140 can initiate a thread having a task module 230. That task module 230 is associated with the each communication interface 144 and the thread running that task module 230. For example, the network interface 144-1 is associated with a network task module 230-1. The KCS interface 144-2 is associated with a KCS task module 230-2. The IPMB interface 144-3 is associated with an IPMB task module 230-3. In certain embodiments, the thread running the task modules are different from each other and different from each of the threads running the message processing modules.

Each of the task module 230 can have a request queue 232 and a request processor 234, as well as a response queue 236 and a response processor 238. The management instance 140 or a task module 230 can use a communication interface 144 to communicate with the communication interface driver 210 and thus receive data sent through a corresponding communication interface controller 204. The data received from a communication interface 144 are placed in the request queue 232 in a format of that communication interface 144. The request processor 234 retrieves the data from the request queue 232 and, when necessary, can construct an IPMI message based on the data received from the communication interface 144. For example, network packets (e.g. IP packets) encapsulating IPMI messages received from the network interface 144-1 are placed in the network request queue 232-1. The network request processor 234-1 then retrieves the network packets from the network request queue 232-1, extracts the IPMI message data from the network packets, and constructs IPMI messages accordingly. Similarly, the KCS interface task module 230-2 can use the KCS interface 144-2 to communicate with KCS interface driver 210-2 and thus retrieves data in the registers of the KCS interface controller 204-2. The KCS interface task module 230-2 can construct IPMI messages in accordance with the data retrieved from the KCS interface 144-2. Further, the IPMB interface task module 230-3 can receive IPMB messages from the IPMB interface 144-3.

The request processor 234 in a task module 230 can obtain an IPMI message and determines where to forward the message to. In particular, the request processor can determine whether the message is an IPMI bridged message. If the message is an IPMI bridged message, the request processor 234 can extract the data for constructing a second message embedded in the IPMI bridged message, and then construct the second message accordingly. The request processor can forward the second message to a task module 230 of the communication interface 144 as indicated in the IPMI bridged message.

If the message retrieved from the request queue 232 is not an IPMI bridged message, the request processor 234 then posts the message to the message handler queue 224 of the corresponding message processing module 222. The message handler 226 then retrieves an IPMI message from the message handler queue 224, and then performance a certain action in accordance with the command in the IPMI message. For example, the IPMI message may instruct the message handler 226 to perform certain action (e.g. get device ID) upon a device 244 or a sensor 242. Accordingly, the message handler 226 accesses the device 244 or sensor 242 and performs the action (e.g., obtains the device ID). In certain embodiments, the management instance 140 can define one or more functions 246, 248 that can be used by the message handler to access the device 244 or sensor 242. Each of the functions 246, 248 has predefined routines to accomplish that function 246, 248. After the action is complete, the message handler 226 constructs an IPMI response message and then posts the response message to the response queue 236 of the corresponding task module 230. The response processor 238 of the task module 230 retrieves the response message from the response queue 236, and then communicates the response message to a requester 112 sending the request message through the corresponding communication interface 144.

For example, the network task module 230-1 runs on a thread initiated by the management instance 140. The network request processor 234-1 retrieves an IPMI message from the network request queue 232-1 and then determines whether the IPMI message is a request to be handled by the network message processing module 222-1 or an IPMI bridged message. For example, the network request processor 234-1 can check the command ID indicated in the IPMI message, and if the command ID corresponds to a Send Message command, the network request processor 234 determines that this IPMI message is a bridged message. If the IPMI message is not a bridged message, the network request processor 234 then posts the IPMI message to the network message handler queue 224-1 of the network message processing module 222-1. The network message processing module runs on its own thread, which is separate from the thread of the network task module 230-1.

The network message handler 226-1 retrieves IPMI messages from the network handler queue 224-1 and then processes those messages. In accordance with the command indicated in the IPMI message, the network message handler can perform certain actions. After the network message handler completes the actions, the network message handler can construct an IPMI response message, with the requested data if the action was to retrieve certain data. The network message handler then posts the response message to the response queue 236-1 of the network task module 230-1.

For example, an IPMI message in the network message handler queue 224-1 may include a Get Sensor Reading command and a sensor number. Accordingly, the network message handler 226-1 locates a logical sensor device 242 representing the requested sensor using the sensor number, and then retrieves a reading from the sensor device 242. For example, the network message handler 226-1 can call a sensor access function 246 defined by the management instance 140 to retrieve the reading. The logical sensor device may return a stored version of a periodically updated reading, or the logical sensor device may use an appropriate communication interface (e.g., I$^2$C) to communicate with the physical sensor, and scan to obtain the reading after receiving the request. After the network message handler 226-1 receives the reading from the sensor device 242, it constructs an IPMI response message including the received sensor reading. Subsequently, the network message handler 226-1 posts the response message to the response queue 236-1 of the network task module 230-1. The response processor 238-1 of the network task module 230-1 based on the indicator in the response message, can determine the identity requester 112 of the response message and retrieve relevant information. Accordingly, the response processor 238-1 can construct network packets addressed to the requester 112 encapsulating the IPMI response message, and then send the network packets to the network through the network interface 144-1. In certain embodiments, the request processor 238 of a task module 230 can save the network information (e.g. IP addresses) of an IPMI request message when processing that message. The saved network information can be used by the response processor 238 to construct network packets encapsulating the IPMI response message.

Further, each message handler 226 may need to access certain shared data collection, such as Sensor Data Record (SDR) 254, System Event Log (SEL) 252, Field Replaceable Unit (FRU) 258, and chassis information 256, in accordance with the command in the IPMI message being processed. To avoid data corruption caused by concurrent data manipulation from two different handlers running on two different threads, various mutual exclusion mechanisms can be used to assist synchronization. For example, a Mutex 260 (or semaphore) can be declared for each data collection 252, 254, 256, 258. A message handler 226 running on a thread must acquire a corresponding Mutex 260 before it can access and manipulate a data collection 252, 254, 256, 258.

For example, the network message handler 226-1 may receive an IPMI message with a Get SDR command and a record ID. The network message handler 226-1 can directly access the SDR repository 254 or call a routine function 262 defined by the management instance 140 for this task. The network message handler 226-1 must acquire the Mutex 260-3 declared for the SDR repository 254 before it can access the SDR repository 254. Suppose that the Mutex is available, the network message handler 226-1 acquires it, and then proceeds to get the specified sensor record from the SDR repository 254. While the network message handler 226-1 is in the process of getting the sensor record, at the same time, the IPMB handler 226-3 may receive an IPMI message with a Delete SDR command with the same record ID. The IPMB handler 226-3 attempts to acquire the Mutex 260-3, which is not available. Thus, the thread of the IPMB handler 226-3 will wait until the Mutex 260-3 is available. Subsequently, the network message handler 226-1 completes the operation of getting the specified sensor record and releases the Mutex 260-3. At this time, the IPMB handler 226-3 is able to acquire the Mutex 260-3 and then proceed to delete that specific sensor record from the SDR repository 254.

In certain embodiments, the management instance initiates a separate thread for each of the Platform Event Filtering (PEF) 278, sensor monitor 272, pending command processing handler 274, and watchdog timer 276 services. Each of the message processing modules 222 can communicate with those services 272, 274, 276, 278.

Typically, a bridged IPMI message embeds data for constructing an IPMB message. For example, the data can include the responder's slave address, the network function, the requester's slave address, the command (e.g. Get Sensor Reading), and sensor number. The remote requester 112 can send a bridged IPMI message, which is encapsulated in network packets, directed to a satellite management controller 129 that is in communication with the IPMB interface controller 204-3 of the BMC 120 through an IPMB bus 270. The network packets received from the network interface 144-1 are posted in the request queue 232-1 of the network task module 230-1. The request processor 234-1 of the network task module 222-1 retrieves the network packets from the network request queue 232-1 and then extracts the IPMI message from the network packets. The request processor 234-1 then determines whether the extracted IPMI message includes a bridging command (i.e., Send Message command).

If the IPMI message is a bridged message, the request processor 234-1 then extracts the data for constructing an IPMB message embedded in the IPMI message. The request processor 234-1 accordingly construct the IPMB message and then post the constructed IPMB message to the request queue 232-3 of the IPMB task module. The request processor 234-3 of the IPMB task module 230-3 retrieves the IPMB message and determines that this message is to be sent to the SMC 129. The request processor 234-3 post the IPMB message to the response queue 236-3 of the IPMB task module 230-3. Then, the response processor 226-3 retrieves the IPMB message from the response queue 236-3 and accordingly sends the IPMB message to the SMC 129 through the IPMB interface 144-3.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A baseboard management controller (BMC), comprising:
   a processor; and
   a memory storing firmware,
   wherein the firmware, when executed by the processor, is configured to include:

a plurality of communication interfaces;

a plurality of task modules, each in communication and associated with a respective different one of the communication interfaces;

a plurality of message handler queues, each associated with a respective different one of the task modules; and a plurality of message handlers, each associated with a respective different one of the message handler queues;

wherein for each communication interface, the task module associated with the communication interface runs on a task thread, and the message handler queue associated with the task module and the message handler associated with the message handler queue run on a handler thread different from the task thread;

the task module associated with the communication interface is configured to:

receive data from the communication interface; and in response to receiving the data, construct an Intelligent Platform Management Interface (IPMI) request message based on the received data, and post the constructed IPMI request message to the associated message handler queue with the task module;

the message handler queue associated with the task module is configured to:

temporarily store the IPMI request message posted by the task module; and the message handler associated with the message handler queue is configured to:

retrieve the IPMI request message from the message handler queue;

process the retrieved IPMI request message; and perform a management function to a host computer of the BMC in accordance with the processed IPMI request message.

2. The BMC of claim 1, wherein the plurality of communication interfaces include at least one of a network interface, a Keyboard Controller Style (KCS) interface, an Intelligent Platform Management Bus (IPMB) interface, a Universal Serial Bus (USB) interface, a serial interface, a User Data Services (UDS) interface, a block transfer interface, and a system management bus interface.

3. The BMC of claim 1, wherein for each communication interface, the message handler is further configured to construct an IPMI response message in response to the retrieved IPMI request message, wherein the IPMI response message is to be sent to the communication interface.

4. The BMC of claim 3, wherein for each communication interface, the message handler is further configured to post the constructed IPMI response message to the task module associated with the communication interface.

5. The BMC of claim 1, wherein each of the plurality of task modules is further configured to:

determine whether the constructed IPMI request message is an IPMI bridged message.

6. The BMC of claim 1, wherein each of the message handlers is configured to utilize a mutual exclusion mechanism to access at least one data collection that is accessible by each of the message handlers.

7. The BMC of claim 6, wherein the at least one data collection includes at least one of a Sensor Data Record (SDR), a System Event Log (SEL), Field Replaceable Unit (FRU) data, and chassis information data.

8. A method for processing Intelligent Platform Management Interface (IPMI) messages on a baseboard management controller (BMC), wherein the BMC includes a processor and a memory storing firmware, the firmware including first and second communication interfaces, first and second task modules in communication and associated with the first and second communication interfaces respectively, first and second message handler queues associated with the first and second task modules respectively, and first and second message handlers associated with the first and second message handler queues, the method comprising:

receiving, at the first and second task modules, respectively, data from the first and second communication interfaces;

in response to receiving the data at the first task module, constructing, at the first task module, a first IPMI request message based on the received data from the first communication interface, and posting the constructed first IPMI request message to the first message handler queue such that the first IPMI request message is temporarily stored at the first message handler queues;

in response to receiving the data at the second task module, constructing, at the second task module, a second IPMI request message based on the received data from the second communication interface, and posting the constructed second IPMI request message to the second message handler queue such that the second IPMI request message is temporarily stored at the second message handler queues;

retrieving, at the first and second message handlers, respectively, the first and second IPMI request messages from the first and second message handler queues;

processing, at the first and second message handlers, respectively, the retrieved first and second IPMI request messages; and performing a management function to a host computer of the BMC in accordance with each of the processed IPMI request;

wherein the first task module runs on a first thread, the second task module runs on a second thread different from the first thread, the first message handler queue and the first message handler run on a third thread different from the first and second threads, and the second message handler queue and the second handler run on a fourth thread different from the first, second and third threads.

9. The method of claim 8, wherein the first and second communication interfaces include at least one of a network interface, a Keyboard Controller Style (KCS) interface, an Intelligent Platform Management Bus (IPMB) interface, a Universal Serial Bus (USB) interface, a serial interface, a User Data Services (UDS) interface, a block transfer interface, and a system management bus interface.

10. The method of claim 8, further comprising:

in response to the retrieved first and second IPMI request messages, constructing first and second IPMI response messages at first and second message handlers, respectively, wherein the first and second IPMI response messages are to be sent to the first and second communication interfaces.

11. The method of claim 10, further comprising:

posting, by the first and second message handlers, respectively, the constructed first and second IPMI response messages to the first and second task module.

12. The method of claim 11, further comprising:
  determining, at each of the first and of task modules, whether each of the constructed first and second IPMI request message is an IPMI bridged message.

13. The method of claim 8, further comprising:
  utilizing, by each of the first and second message handlers, a mutual exclusion mechanism to access at least one data collection that is accessible by each of the first and second message handlers.

14. The method of claim 13, wherein the at least one data collection includes at least one of a Sensor Data Record (SDR), a System Event Log (SEL), Field Replaceable Unit (FRU) data, and chassis information data.

15. A non-transitory computer storage medium having computer-executable instructions stored thereon which, when executed by a processor of a baseboard management controller (BMC), the BMC including a memory storing firmware, the firmware including first and second communication interfaces, first and second task modules in communication with the first and second communication interfaces respectively, first and second message handler queues associated with the first and second task modules respectively, and first and second message handlers associated with the first and second message handler queues, and first and second message handlers associated with the first and second message handler queues, cause the processor to:
  receive, at the first and second task modules, respectively, data from the first and second communication interfaces;
  in response to receiving the data at the first task module, construct, at the first task module, a first Intelligent Platform Management Interface (IPMI) request message based on the received data from the first communication interface, and post the constructed first IPMI request message to the first message handler queue such that the first IPMI request message is temporarily stored at the first message handler queues;
  in response to receiving the data at the second task module, construct, at the second task module, a second IPMI request message based on the received data from the second communication interface, and post the constructed second IPMI request message to the second message handler queue such that the second IPMI request message is temporarily stored at the second message handler queues;
  retrieve, at the first and second message handlers, respectively, the first and second IPMI request messages from the first and second message handler queues;
  and process the retrieved IPMI request messages
  process, at the first and second message handlers, respectively, the retrieved first and second IPMI request messages; and
  perform a management function to a host computer of the BMC in accordance with each of the processed IPMI request;
  wherein the first task module runs on a first thread, the second task module runs on a second thread different from the first thread, the first message handler queue and the first message handler run on a third thread different from the first and second threads, and the second message handler queue and the second handler run on a fourth thread different from the first, second and third threads.

16. The non-transitory computer storage medium of claim 15, wherein the first and second communication interfaces include at least one of a network interface, a Keyboard Controller Style (KCS) interface, an Intelligent Platform Management Bus (IPMB) interface, a Universal Serial Bus (USB) interface, a serial interface, a User Data Services (UDS) interface, a block transfer interface, and a system management bus interface.

17. The non-transitory computer storage medium of claim 15, wherein the instructions, when executed, further cause the processor to:
  in response to the retrieved first and second IPMI request messages, construct first and second IPMI response messages at first and second message handlers, respectively, wherein the first and second IPMI response messages are to be sent to the first and second communication interfaces.

18. The non-transitory computer storage medium of claim 17, wherein the instructions, when executed, further cause the processor to:
  post, by the first and second message handlers, respectively, the constructed first and second IPMI response messages to the first and second task module; and
  determine, at each of the first and of task modules, whether each of the constructed first and second IPMI request message is an IPMI bridged message.

19. The non-transitory computer storage medium of claim 15, comprising:
  utilizing, by each of the first and second message handlers, a mutual exclusion mechanism to access at least one data collection that is accessible by each of the first and second message handlers.

* * * * *